United States Patent
Pannhorst et al.

(12) 
(10) Patent No.: US 6,376,402 B1
(45) Date of Patent: Apr. 23, 2002

(54) GLASSES AND GLASS-CERAMICS WITH HIGH SPECIFIC YOUNG'S MODULUS AND THEIR APPLICATIONS

(75) Inventors: Wolfgang Pannhorst; Ute Woelfel, both of Mainz; Silke Wolff, Hueckeswagen, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/551,993

(22) Filed: Apr. 19, 2000

(30) Foreign Application Priority Data

Apr. 20, 1999 (DE) .................................. 199 17 921.2

(51) Int. Cl.[7] .................. C03L 3/091; C03L 3/064; C03L 10/04; G11B 5/73
(52) U.S. Cl. .................... 501/66; 501/67; 501/77; 501/79; 501/4; 501/5; 501/7; 501/9; 428/694 ST
(58) Field of Search ................ 501/4, 5, 7, 9, 501/66, 67, 77, 79; 428/694 ST

(56) References Cited

U.S. PATENT DOCUMENTS

| | | | | |
|---|---|---|---|---|
| 5,997,977 A | * | 12/1999 | Zou et al. | 428/694 ST |
| 5,998,314 A | * | 12/1999 | Sugimoto | 501/32 |
| 6,034,011 A | * | 3/2000 | Yamaguchi et al. | 501/4 |
| 6,162,751 A | * | 12/2000 | Speit et al. | 501/73 |
| 6,184,162 B1 | * | 2/2001 | Speit et al. | 501/10 |
| 6,191,058 B1 | * | 2/2001 | Yamaguchi et al. | 501/4 |
| 6,214,429 B1 | * | 4/2001 | Zou et al. | 428/694 ST |

FOREIGN PATENT DOCUMENTS

| | | |
|---|---|---|
| DE | 42 06 268 A1 | 11/1992 |
| DE | 198 02 919.5 | 1/1998 |
| EP | 0 287 345 A1 | 10/1988 |
| EP | 0 626 353 A1 | 11/1994 |
| EP | 0 858 974 A1 | 8/1998 |
| JP | 59-41934 | 10/1984 |
| JP | 63-64941 | 3/1988 |
| JP | 63-170247 | 7/1988 |
| JP | 4-198041 | 7/1992 |
| WO | 96/11888 | 4/1996 |

OTHER PUBLICATIONS

Idema Alternative Substrates III, Sep. 5, 1995, San Jose Califormia, pp. 55–60; D.J. Perettie et al: "the Alternative Substrate—"Chemicallly Strengthened" Aluminium Composite".

* cited by examiner

*Primary Examiner*—Karl Group
(74) *Attorney, Agent, or Firm*—Michael J. Striker

(57) ABSTRACT

The glass or glass-ceramic has the following composition (in % by weight based on oxide content): $SiO_2$, 25 to 50; $B_2O_3$, >5 to 16; $Al_2O_3$, 10 to 17; $P_2O_5$, 0 to 8; $Li_2O$, 5 to 15; $Na_2O$, 0 to 10; $K_2O$, 0 to 10; MgO, 10 to 30; CaO, 0 to 10; SrO, 0 to 8; ZnO, 0 to 8; $TiO_2$, 0.1 to 10; $ZrO_2$, 0 to 8; and at least one refining agent, in an amount as needed according to its purpose. The sum total amount of divalent metal oxides (RO) present is less or equal to than 45% by weight based on oxide content and the sum total amount of alkali metal oxides ($R_2O$) present is less than or equal to 30% by weight based on oxide content. The glass or glass-ceramic material generally has elasticity modulus values (E)>$90\times10^3$ $N/mm^2$ and <$125\times10^3$ $N/mm^2$, specific elasticity modulus values (E/ρ)>$30\times10^5$ N cm/g and <$45\times10^5$ N cm/g and thermal expansion coefficient values ($\alpha_{20/300}$)>$7.0\times10^{-6}$/K and <$11.0\times10^{-6}$/K. The material is outstandingly suitable for making fixed disk substrates.

14 Claims, No Drawings

GLASSES AND GLASS-CERAMICS WITH HIGH SPECIFIC YOUNG'S MODULUS AND THEIR APPLICATIONS

BACKGROUND OF THE INVENTION

1. Field of the Invention

The present invention relates to glasses and glass-ceramics with a high specific elasticity modulus and their uses or applications.

2. Prior Art

Glass is advantageous for use as a substrate for data carriers (hard disks) in contrast to metals, such as aluminum or metal alloys, because of its planarity and its reduced surface roughness. Glass as the most uniform material provides the possibility of polishing the surface of the glass body so that it is very smooth. The manufacturing processes for glass substrates are more rapid and less expensive than the corresponding methods of making aluminum substrates.

Substrate glass for hard disks must withstand increased chemical, thermal and mechanical stresses in use. It experiences high temperatures with high cooling rates during coating (for example by cathode sputtering). High mechanical stresses occur when hard disks are used, e.g. during manufacture clamping stresses at the rotation axis and in operation stresses due to centrifugal and precession forces at high rotation speeds of currently from 3500 to 10000 rpm. Above all these stresses can only be withstood by glasses that are 0.25 to 3.0 mm thick when they are pre-stressed. Since an increase in mechanical strength by thermal pre-stressing is only possible with a minimum thickness of 3 mm, glasses must be chemically pre-stressed for the above-described application, i.e. by ion exchange.

G-shock loads, e.g. by rough transport, which lead to tearing and cracking, can be countered by pre-stressing. Furthermore the breaking strength is increased.

Ion exchange in glasses, especially with alkali metal ions, can achieve various goals. The two most important are (a) changing the optical values or data, in order to produce graded materials and (b) production of compressive stresses in the surface region of the glass material in order to reduce the susceptibility of the glasses to bending forces.

In graded glasses (a) it is desirable to avoid difficult and/or expensive working processes by introducing a predetermined index of refraction profile. Stresses in the glass are to be avoided, in order to suppress the complication of stress birefringence (division of an optical beam into ordinary and extraordinary beam). Alkali metal ions, which avoid production of stress double refraction but only when coupled with $Ag^+$ ions as described below, are used for ion exchange in this application. For this application $Na^+$ ions are preferably exchanged with $Ag^+$ ions; no stresses arise because the radii of the two ions are nearly equal.

If in contrast surface compressive stresses should be produced by ion exchange, ions are preferably exchanged with each other whose ionic radii are greatly different. Pre-stressing is however only achieved if the glass has a basic three dimensional structure that does not change during the ion exchange so that for example ions can directly diffuse into the glass from a salt bath to the positions of the ions that diffuse out of the glass. Thus ion exchange occurs at temperatures below the glass transition temperature, $T_g$, since otherwise the three dimensional structure would relax and the pre-stressing would not occur. Compressive stresses build up, when ions of larger radius diffuse into the glass than diffuse out. Typically $Na^+$ ions are exchanged with $K^+$ ions; chemical pre-stressing occurs however in the exchange of $Li^+$ ions by $Na^+$ ions or $K^+$ ions by $Cs^+$ ions.

It has been shown that alumino-silicate glasses are especially suitable for ion exchange. An open three-dimensional structure, in which the alkali ions are especially mobile and which is stable to relaxation, is prepared by insertion of Al into Si-tetrahedral positions and by the associated charge compensation by alkali ions.

The requirements regarding mechanical stability of glasses acting as hard disk substrates increase with future increases in the rotation speed of the hard is disks.

Developments in the hard disk market are directed toward data carriers with higher capacity and greater data transfer rate with the measurements of the data carrying means remaining the same or being reduced. Higher data transfer rates require higher rotation speeds for the hard disk mounted on the drive device and lower flight heights of the reading device. With disks of the same dimensions capacity can be increased only by higher track densities on the hard disks or by increasing the number of hard disks in the disk drive device. However an increase in the rotation speed causes a strong flutter or pulsation of the hard disk outer edges, which again makes the desired higher track density, also a reduced track spacing and also a narrow stacking of the hard disks, impossible. Because of this flutter motion also the flight height or glide height of the read-write head over the hard disk cannot be reduced, as is desired for an increasing the read/write speed and the information density.

The hard disk thus requires a high shape stability, i.e. it should have a time dependent disk flutter that is as small as possible at its outer edges. The maximum disk flutter W is given by the following formula I:

$$W=\{[\rho \times r_A^4]/[E \times d^2]\} f(v) \qquad \text{I,}$$

wherein $\rho$=density $r_A$=outer diameter of the fixed plate

E=elasticity modulus d=thickness of the fixed plate f(v)=geometry-specific parameters.

The chief specifications or requirements for hard disks can be derived from this formula. When the geometry remains the same (i.e. d, $r_A$, constant) the maximum flutter W is reduced when the elasticity modulus E is higher and/or the density $\rho$ is less. Usually the quotient of these parameters $E/\rho$ is designated as the specific Young's modulus. It should take the highest possible value.

However the known ion exchangeable alkali alumino-silicate glasses do not have a particularly high Young's modulus, typically E<90 GPa. Particularly the new environmentally friendly optical glasses are currently known to be glasses of high Young's modulus. To obtain the Young's modulus they contain, for example, $La_2O$, $Ta_2O_5$ or high proportions of $TiO_2$ beneath the classic glass forming agents, which however scarcely have the required three dimensional structure capable of ion exchange and which are structure changing agents, so that the glasses are inclined toward early crystallization.

An additional requirement of glass suitable for hard disk substrates is its thermal expansion coefficient, which should not be too different from that of the clamping and spindle material used for the drive device (with thermal expansion coefficients $\alpha_{20/300}>12 \times 10^{-6}/K$) in order to avoid stresses.

Glass-ceramic material is, above all, an interesting material for the above-described application because of its fracture toughness, without chemical pre-stressing. However in currently used glass-ceramics the crystallite size limits the surface roughness to a high value. There is a danger with insufficiently smooth surfaces, especially with the flight height or glide height of the read-write head, that, when the read-write head is placed on the disk, mechanical damage of the disk can occur and thus data loss.

The glasses and glass-ceramics known for this application are chiefly high $SiO_2$-containing alumino-silicate glasses or lithium aluminum silicate glass-ceramics, which have poor fusion properties because of their high $SiO_2$ content and high $Al_2O_3$ content but fairly low Young's modulus. The chemically improved glass composition for substrates for information recording media disclosed in DE 42 06 268 A1 having a content of from 62 to 75 percent by weight $SiO_2$ should be mentioned. Also the glass-ceramic for magnetic disk substrates disclosed in EP 626 353 A1 having a $SiO_2$ content of from 65 to 83% by weight, which contains α-quartz and lithium silicate, should be mentioned in this connection.

The known glasses and glass-ceramics and other materials do not simultaneously fulfill all the requirements for a material for a hard disk, especially a hard disk with a high rotation speed, but have a very wide variety of disadvantages.

Different publications described ion exchangeable glasses for production of index of refraction gradients.

EP 0 287 345 A1 describes glasses for lenses with an index of refraction gradient, which have a comparatively high $Na_2O$ and/or $K_2O$ content besides $Li_2O$. Because of the existing facultative and other ingredients, for example with an MgO content between 0 and 10%, these glasses have a rather small Young's modulus, especially a small specific Young's modulus, which may be unsuitable for making hard disk substrates. Also $B_2O_3$ and $Al_2O_3$ are only facultative ingredients. Finally this is also true for the $Li_2O$- and $Na_2O$-containing glasses for the converging lenses from JP 59-41 934 B2 and JP 63-64 941 A, in which no single alumino-borosilicate glass is described. Also $Al_2O_3$ (with only a maximum of 7 mol %) and $B_2O_3$ are facultative ingredients in the ion exchangeable glasses for producing a refractive index gradient described in JP 63-170 247A. No examples of glasses are disclosed, which have a high specific elastic modulus besides ion exchangeability within a comparatively large and widely varying composition range, since ingredients, such as BaO, which strongly increase the density of the glass are present. Also this publication provides no suggestions regarding choice of composition of a glass in order to provide shape stability (higher specific elastic modulus) and breaking strength (high pre-stressing) at the same time. The disclosed glasses are not suitable for use as hard disk substrates.

JP 4-198 041 A describes crystallized glasses, which are used as building materials. These glasses contain MgO and ZnO with high glass-forming fractions. The ZnO fraction must be greater than the MgO fraction, which is disadvantageous for the fusion and viscosity properties.

The importance of high Young's modulus for hard disk substrates is emphasized in EP 858 974 A1. The glass groups described there have high transformation temperatures and are not easily melted or processed because of their composition, especially their small content or absence of $B_2O_3$.

Also WO 96/11888 describes glass substrates for recording media, which contain only facultative ingredients and also only small amounts of $B_2O_3$ and thus are only poorly meltable. These $Li_2O$-free glasses contain a maximum of 8% by weight of the facultative MgO, at least 11 percent by weight RO, which does not permit a high specific Young's modulus.

A material made from Al—B—C, which has a reduced density, a high strength and a very specific high elastic modulus E/ρ, is described in IDEMA, Alternative Substrates III (Sep. 5, 1995, San Jose Calif.), pp. 55 to 60; D. J. Perettie, et al, "The Alternative Alternative Substrate—"Chemically Strengthened"Aluminum Composite". This material however can only be polished with great effort to the surface quality required for high quality hard disks. Hard disks made from this material are very costly primarily because of this great abrasion resistance.

SUMMARY OF THE INVENTION

It is an object of the present invention to provide a material, which has a high specific elastic modulus because of a high Young's modulus and a low density, and a comparatively large thermal expansion coefficient, which is easily melted and which has a sufficient breakage toughness, or can be chemically prestressed so that a sufficient breakage toughness is provided, and which has good surface properties.

According to the claimed invention this material is a glass or glass-ceramic with high specific elastic modulus comprising (in weight percent based on oxide content)

| | |
|---|---|
| $SiO_2$ | 25 to 50 |
| $B_2O_3$ | >5 to 16 |
| $Al_2O_3$ | 10 to 17 |
| $P_2O_5$ | 0 to 8 |
| $Li_2O$ | 5 to 15 |
| $Na_2O$ | 0 to 10 |
| $K_2O$ | 0 to 10 |
| MgO | 10 to 30 |
| CaO | 0 to 10 |
| SrO | 0 to 8 |
| ZnO | 0 to 8 |
| $TiO_2$ | 0.1 to 10 |
| $ZrO_2$ | 0 to 8 | and at least one refining agent, as needed, in an amount suitable for its purpose, namely refining. In addition, a sum total amount of divalent metal oxides (RO) present is less than or equal to 45% by weight based on the oxide content. Also a sum total amount of alkali metal oxides ($R_2O$) present is less than or equal to 30% by weight based on the oxide content.

The invention also includes a method of making hard disks, especially hard disks used as recording media, in which the hard disk substrate is made from the above-described glass or glass-ceramic materials according to the invention.

The material according to the invention contains 25 to 50% by weight, preferably 30 to 45% by weight $Si_2O$ and 10 to 17% by weight, preferably 10 to 15% by weight, $Al_2O_3$. Because of these preferred amounts, both Young's modulus providing ingredients of the classical alumino-silicate glasses present in measured amounts with respect to each other raise the Young's modulus, without increasing the density too much. $Al_2O_3$ also increases the Knoop hardness of the material. The Knoop hardness is a measure of the indentation hardness. Greater than 5 to 16% by weight of $B_2O_3$ are present as glass forming agents for formation of a stable three-dimensional structure. Thus the sum of the classical glass forming agents ($SiO_2$, $Al_2O_3$, $B_2O_3$) present amounts to between greater than 40 percent by weight and 83% by weight. The sum total of these ingredients preferably amounts at least 50% by weight. A stable, not relaxed base glass is obtained after ion exchange because of the above-mentioned fraction of glass forming agents present. The fusion of the glass is substantially improved by the above-described proportion of $B_2O_3$ present. The $B_2O_3$ content causes a viscosity lowering and makes the glass "longer". Thus the material has a viscosity behavior that allows a direct hot forming process for forming thin disks to be successful. An increase in the $B_2O_3$ content over the above-stated range would reduce the chemical resistance, the Young's modulus and the Knoop hardness. Preferably the $B_2O_3$ upper concentration limit amounts to 14% by weight.

Similar glasses, whoever only facultative $B_2O_3$-containing glasses with only a small $B_2O_3$ content, are described in German Patent Application DE 198 02 919.5, which has already been filed by the above-listed same applicants.

One or more alkaline earth metal oxides are present as Young's modulus increasing ingredients. From 10 to 30, preferably 15 to 30% by weight MgO, from 0 to 10, preferably from 0 to 8% by weight CaO and 0 to 8% by weight SrO can be present as the alkaline earth oxides. However from 0 to 8% by weight ZnO can also be present. The sum of the divalent metal oxides (RO) amounts to up to 45% by weight, preferably up to 40% by weight, especially preferably up to 35% by weight and most preferably up to 30% by weight.

The material according to the invention contains from 5 to 30% by weight alkali metal oxides as a flux material. Higher amounts would lower both the Young's modulus and the Knoop hardness as well as the chemical resistance. The largest amount of these oxides present is preferably 20% by weight, especially preferably 17% by weight and most preferably 15% by weight.

Of the alkali metal oxides $Na_2O$ can be present in amounts of from 0 to 10% by weight, preferably from 0 to 6% by weight, and $K_2O$, in amounts of from 0 to 10 percent by weight, preferably of 0 to 8% by weight. $Li_2O$ is a necessarily required ingredient that is present in amounts of 5 to 15%, preferably 5 to 12%, by weight, since this ingredient is essential for the chemical pre-stressing of these materials by ion exchange. The required high Young's modulus or high specific Young's modulus would not be achieved with too high a proportion of $K_2O$ and $Na_2O$.

The material can contain $P_2O_5$ in amounts up to 8% by weight. $P_2O_5$, which makes the ion exchange easier in the alkaline earth alumino-silicate compositions, since these amounts apparently are required for the three dimensional structure for the ion exchange. The presence of at least 1 percent by weight $P_2O_5$ is preferred. Higher proportions than 8% by weight may however lower the Young's modulus and Knoop hardness too much. It is advantageous when the $P_2O_5$ upper concentration limit is comparatively low, since these $P_2O_5$-containing compositions still can be handled despite melting and evaporation problems of $P_2O_5$.

The material also contains from 0.1 to 10% by weight of $TiO_2$. Preferably from 1 to 8% by weight of this ingredient is required in order to guarantee sufficient chemical stability in this $B_2O_3$- and comparatively high $R_2O$-containing composition. For the same reason the material can contain up to 8% by weight, preferably up to 5% by weight, $ZrO_2$. Both ingredients contribute positively to a high Young's modulus.

Because of the proportion of $Li_2O$ and $TiO_2$ and, if needed, $ZrO_2$ present, combined with a high MgO content, i.e. with a MgO content greater than or equal to 21% by weight, together with $TiO_2+ZrO_2$ greater than or equal to 6% by weight, during cooling on crystallization in the glass after melting and hot forming the processing is controlled so that the proportions of crystallization-inducing and crystallization-inhibiting ingredients are balanced. The right cooling profile promotes ceramicizing. A fine grained crystalline phase that is highly uniform in size and distribution is formed, whose hardness is uniform in the glass phase, so that the material may be easily worked to produce a smooth surface. With increasing ceramicizing ingredients, which increase with the proportion of divalent oxides (RO), the Young's modulus and Knoop hardness increase. With an increasing fraction of the material in the crystalline phase little or no pre-stressing occurs during ion exchange or rapid relaxation occurs, however these glass-ceramic materials already have a sufficient fracture toughness without pre-stressing. According to the phase ratio (ratio of crystalline to glass phase) and the size of the crystallites the glass-ceramic is transparent, translucent or opaque. Therefore good surface workability is independent of the transmission. The material typically has brittle properties at a higher RO content than mentioned above.

Hard disk substrates made from opaque or e.g. material having a reduced transmission because of the addition of a coloring agent advantageously have reduced permeability for the test light of a surface quality testing device, which detects faults or errors in the surface and not the volume. The glasses and glass-ceramics can thus contain up to a total amount of 10% by weight of one or more coloring agents. The coloring agents are selected from the group consisting of $Fe_2O_3$, NiO, $Cr_2O_3$, CoO, CuO and $V_2O_5$.

A conventional refining agent, such as $As_2O_3$, $S_2O_3$ and NaCl, can be added to the glass or the base glass of the glass-ceramic for refining. The refining agents are added in the standard amounts, i.e. according to the amount and type of refining agents in amounts of from 0.05 to 1% by weight in the product.

Preferably the refining agent $As_2O_3$ is avoided. That is the amount of arsenic oxide present is limited to unavoidable trace impurity amounts, since the material according to the invention should be environmentally friendly. For the same reason the material should contain no PbO.

Furthermore the glasses or glass-ceramics can contain laser-active ingredients, which permit the laser texturing of the substrate surface prior to coating. These materials can thus contain up to a total of 8% by weight of oxides of one or more element selected from the following group: Ga, Ge, Y, Nb, Mo, La, Ce, Pr, Nd, Gd, Tb, Dy, Ho, Er, Tm, Yb, Hf and Ta.

The ion exchange of $Li^+$ ions and if necessary also $Na^+$ ions with $Na^+$ and/or $K^+$ can occur in a known way by introduction of the glass or glass-ceramic into a melt (salt bath) of rather low melting sodium and/or potassium salts, e.g. their nitrates, or by application of pastes of rather high melting sodium and/or potassium salts, e.g. their sulfates, to the surface of the material. The bath or the paste can also contain amounts of Li salts. Preferably exchange with sodium salt is preferred. Acting times and temperatures correspond to the standard conditions for these ion exchange processes and depend on the respective compositions. Below the transformation temperature $T_g$, acting times of from 1 to 6 hours, preferably between 1 and 8 hours, and temperatures between $T_g-120$ K and $T_g-30$ K are used. Within these ranges the lower temperatures require greater dwell times. Thus at higher temperatures and rather close to $T_g$, that is approximately from $(T_g-30)$ to $(T_g-50)$ K exchange by means of salt pastes, in general with shorter exchange times in comparison to those in chemical pre-stressing with salt baths, is possible. Ion exchange profile depths >15 μm and pre-stressing depths σ>50 MPa can be obtained.

Especially exchange profiles with a not too high pre-stressing are obtained by a prolonged exchange extending beyond the maximum so that still deeper exchange occurs, but with stress values reduced because of relaxation. Too high pre-stressing means pre-stressing >500 MPa, which could lead to self-destruction of the substrate.

Also two-fold ion exchange, so-called "concealed or masked" profiles, is possible. In that type of ion exchange e.g. first $Li^+$ is exchanged with $Na^+$ in a deep zone by a comparatively long acting time. Then in a second step in the thinner surface zone $Na^+$ is again exchanged with $Li^+$ during an acting time of from ⅓ to ½ of that of the first exchange.

Particularly preferred glasses, which have the required properties and especially may be satisfactorily chemically pre-stressed have the following composition range (in % by weight based on the oxides): $SiO_2$, 35 to 45, preferably 40 to 45; $B_2O_3$, 6 to 12, preferably 6 to 10; $Al_2O_3$, 10 to 14; preferably 11 to 13; $P_2O_5$, 0.1 to 5, preferably 0.1 to 3; $Li_2O$, 8 to 12, preferably 9 to 11; $Na_2O$, 0 to 4, preferably 0 to 2, preferably free of $Na_2O$; $K_2O$, 0 to 4, preferably 0 to 2, and most preferably free of $K_2O$; sum total of $R_2O<15$; MgO, 15 to 25, preferably from 17 to 23; CaO, 0 to 5, preferably 0 to 3, most preferably 0, i.e. CaO free; SrO, 0 to 5, preferably 0 to 3, most preferably free of SrO; ZnO, 0 to 5, preferably 0 to 2, most preferably free of ZnO; sum total of RO<35, preferably 30; $TiO_2$, 3 to 8, preferably 3 to 7; and $ZrO_2$, 0 to <5, preferably 0 to 3, with $TiO_2+ZrO_2<10$.

EXAMPLES

Seventeen examples of the glasses (#1 to 16 and 18) according to the invention and one example of a glass-ceramic (#17) according to the invention appear in the following Table I. Table I includes the composition (in % by weight based on oxide content) and a statement of the important properties. Standard raw materials are used to make the glasses and glass-ceramic of Table I. The mixture is melted at about 1400° C. in a continuous melting unit, refined at about 1360° C. and homogenized after that. The glass is poured and cooled at a casting temperature of about 1350° C. During the cooling process the ceramicizing is performed with the high MO and $TiO_2+ZrO_2$-containing compositions. Circular disks are made in the usual way from cast blocks (glass or glass-ceramic bodies), which have the form and dimensions of hard disk substrates, i.e. an outer diameter of 65.0 mm and a thickness of 0.635 mm and a concentric interior hole with a diameter of 20.00 mm.

The thermal expansion coefficient $\alpha_{20/300}$ of the glasses and the glass-ceramic is $>7.0\times10^{-6}$/K and $<11.0\times10^{-6}$/K and thus is sufficiently close to the spindle material, which holds the hard disk on the drive device. Besides the thermal expansion coefficient $\alpha_{20/300}$ and the transformation temperature $T_g$ of the glasses and the glass-ceramic, Table I lists significant properties for the hard disk substrate application including elasticity modulus E [$10^3 N/mm^2$], density $\rho$ [$g/cm^3$] and calculated specific elasticity modulus $E/\rho$ [$10^5$ N cm/g]. The Young's modulus is determined in samples that were not pre-stressed. The glasses and glass-ceramic have elasticity modulus values $E>90\times10^3$ $N/mm^2$, and $<125\times10^3$ $N/mm^2$, primarily $115\times10^3$ $N/mm^2$, and the specific Young's modulus values $E/\rho>30\times10^5$ N cm/g, chiefly $>35\times10^5$ N cm/g, and $<45\times10^5$ N cm/g. Very large specific elasticity modulus values are obtained because of the low densities of the glasses and the glass-ceramic. Also Knoop hardness HK (0,1/20) according to DIN ISO 9385 is given for each example in Table I.

TABLE I

COMPOSITIONS AND IMPORTANT PROPERTIES OF THE GLASSES AND GLASS-CERAMICS ACCORDING TO THE INVENTION

Part I.

|  | 1 | 2 | 3 | 4 | 5 | 6 | 7 | 8 | 9 |
|---|---|---|---|---|---|---|---|---|---|
| $SiO_2$ | 44.0 | 35.0 | 36.0 | 30.0 | 42.0 | 45.0 | 34.5 | 38.5 | 32.0 |
| $Al_2O_3$ | 17.0 | 17.0 | 12.0 | 17.0 | 11.0 | 12.0 | 14.5 | 14.0 | 17.0 |
| $B_2O_3$ | 16.0 | 8.0 | 16.0 | 16.0 | 10.0 | 8.0 | 11.5 | 14.5 | 11.0 |
| $P_2O_5$ |  |  | 8.0 |  |  |  | 3.5 |  | 8.0 |
| $Na_2O$ |  | 8.0 | 5.0 | 5.0 |  | 5.0 | 1.5 | 2.0 |  |
| $Li_2O$ | 6.0 | 5.0 | 6.0 | 6.0 | 7.0 | 6.0 | 8.0 | 8.0 | 10.0 |
| $K_2O$ |  |  |  |  | 2.0 |  |  |  |  |
| MgO | 16.0 | 26.0 | 16.0 | 21.0 | 18.0 | 16.0 | 21.0 | 21.5 | 20.0 |
| CaO |  |  |  |  |  |  |  |  |  |
| SrO |  |  |  |  |  |  |  |  |  |
| ZnO |  |  |  |  |  |  |  |  |  |
| $TiO_2$ | 1.0 | 1.0 | 1.0 | 5.0 | 7.0 | 3.0 | 3.0 | 1.5 | 2.0 |
| $ZrO_2$ |  |  |  |  |  |  | 5.0 | 2.5 |  |
| $V_2O_5$ |  |  |  |  |  |  |  |  |  |
| CoO |  |  |  |  | 3.0 |  |  |  |  |
| E | 95 | 103 | 92 | 101 | 108 | 100 | 104 | 102 | 101 |
| $\rho$ | 2.52 | 2.66 | 2.54 | 2.62 | 2.63 | 2.65 | 2.66 | 2.60 | 2.60 |
| $E/\rho$ | 38 | 39 | 36 | 39 | 41 | 38 | 39 | 39 | 39 |
| HK | 710 | 710 | 630 | 700 | 720 | 710 | 740 | 720 | 670 |
| $\alpha_{20/300}$ | 8.0 | 9.1 | 8.9 | 9.0 | 8.8 | 8.5 | 8.7 | 8.7 | 9.1 |
| $T_g$ | 540 | 526 | 498 | 502 | 516 | 523 | 517 | 499 | 503 |

Part II.

|  | 10 | 11 | 12 | 13 | 14 | 15 | 16 | 17 | 18 |
|---|---|---|---|---|---|---|---|---|---|
| $SiO_2$ | 40.0 | 28.5 | 30.0 | 30.0 | 40.0 | 34.0 | 34.0 | 40.0 | 34.0 |
| $Al_2O_3$ | 17.0 | 11.5 | 12.0 | 17.0 | 12.0 | 13.0 | 17.0 | 15.0 | 14.0 |
| $B_2O_3$ | 8.0 | 15.5 | 8.0 | 8.0 | 8.0 | 16.0 | 16.0 | 5.0 | 12.5 |
| $P_2O_5$ | 8.0 | 7.5 | 8.0 | 8.0 | 8.0 |  |  |  | 5.0 |
| $Na_2O$ |  |  | 4.0 | 5.0 |  | 1.0 | 1.0 | 5.0 | 1.0 |
| $Li_2O$ | 6.0 | 9.5 | 6.0 | 6.0 | 10.0 | 5.0 | 10.0 | 8.0 | 9.0 |
| $K_2O$ |  |  |  |  |  | 5.0 |  |  |  |

TABLE I-continued

COMPOSITIONS AND IMPORTANT PROPERTIES OF THE
GLASSES AND GLASS-CERAMICS ACCORDING TO THE INVENTION

| | | | | | | | | | |
|---|---|---|---|---|---|---|---|---|---|
| MgO | 16.0 | 15.0 | 20.0 | 20.0 | 16.0 | 25.0 | 16.0 | 21.0 | 21.5 |
| CaO | | | 4.0 | | | | | | |
| SrO | | | 3.0 | | | | | | |
| ZnO | | | | | | | | | |
| $TiO_2$ | 5.0 | 4.5 | 5.0 | 1.0 | 1.0 | 1.0 | 1.0 | 3.0 | 1.0 |
| $ZrO_2$ | | 3.0 | | 5.0 | 5.0 | | 5.0 | 3.0 | |
| $V_2O_5$ | | 5.0 | | | | | | | |
| CoO | | | | | | | | | |
| E | 96 | 100 | 100 | 100 | 99 | 110 | 102 | 106 | 102 |
| ρ | 2.59 | 2.62 | 2.64 | 2.68 | 2.63 | 2.69 | 2.61 | 2.69 | 2.64 |
| E/ρ | 37 | 38 | 38 | 37 | 38 | 41 | 39 | 39 | 39 |
| HK | 660 | 660 | 670 | 700 | 650 | 670 | 670 | 730 | 730 |
| $\alpha_{20/300}$ | 8.0 | 9.0 | 9.5 | 10.4 | 8.8 | 9.6 | 8.9 | 9.5 | 9.1 |
| $T_g$ | 555 | 496 | 503 | 517 | 515 | 483 | 487 | 508 | 501 |

Units of E, $10^3$ N/mm$^2$;
ρ, g/cm$^3$;
E/ρ, $10^5$ N cm/g;
$\alpha_{20/300}$, $10^{-6}$/K;
$T_g$, °C.

The following table II contains the results for ion exchange with different exemplary compositions and different exchange conditions, i.e. exchange times and temperatures. The ion exchanges were performed in a salt melt of 95% by weight $NaNO_3$ and 5% by weight NaCl with 2 mm thick polished disks having dimensions 6 mm×50 mm that were edge-faceted. Table 11 lists the exchange time [h], the exchange temperature T[° C.] of the treated glass and the difference between the transformation temperature and the exchange temperature ΔT [K]=$T_g$–T, rounded to 5 K. Furthermore it contains the desired compressive stress [MPa] and the respective depths of the compressive stressed zone and of the profile depth [μm], measured by means of energy-dispersive X-ray analysis (EDX). The compressive stress is determined on a ground section of the ion-exchanged disk. The compressive stress values show that the materials have a high breakage toughness and tear or crack resistance.

The materials according to the invention, both the glasses and also the glass-ceramic, fulfill all the specifications for materials for making fixed disk substrates and combine up to now supposedly incompatible properties.

Because of their high specific elastic modulus they have great shape stability and they are easily manufactured because of their good melting and processing properties.

TABLE II

ION EXCHANGE RESULTS (TABLE I GIVES THE COMPOSITIONS)

| | RUN | | | | | | | |
|---|---|---|---|---|---|---|---|---|
| | I | II | III | IV | V | VI | VII | VIII |
| | | | | EXAMPLE | | | | |
| 1 | 1 | 1 | 2 | 3 | 7 | 11 | 14 | 18 |
| $T_g$ [° C.] | 540 | 540 | 526 | 498 | 517 | 496 | 515 | 500 |
| T [° C.] | 500 | 500 | 460 | 440 | 460 | 430 | 455 | 420 |
| ΔT [K] | 40 | 40 | 65 | 60 | 55 | 65 | 60 | 80 |
| t (h) | 4 | 8 | 4 | 4 | 4 | 4 | 4 | 4 |
| Compressive Stress [MPa] | 100 | 175 | 155 | 240 | 125 | n/a | 190 | 65 |
| Depth of Pre-stressing [μm] | 30 | 50 | 25 | 130 | 20 | n/a | 20 | 10 |
| Profile Depth of Ion exchange [μm] | 60 | 95 | 30 | 190 | 35 | 50 | 75 | n/a |

TABLE II-continued

ION EXCHANGE RESULTS (CON)

| | RUN | | | | | | |
|---|---|---|---|---|---|---|---|
| | IX | X | XI | XII | XIII | XIV | XV |
| | | | | EXAMPLE | | | |
| | 18 | 18 | 18 | 18 | 18 | 18 | 18 |
| $T_g$ [° C.] | 500 | 500 | 500 | 500 | 500 | 500 | 500 |
| T [° C.] | 420 | 420 | 440 | 440 | 440 | 460 | 460 |
| ΔT [K] | 80 | 80 | 60 | 60 | 60 | 40 | 40 |
| t (h) | 8 | 16 | 4 | 8 | 16 | 8 | 16 |
| Compressive Stress [MPa] | 100 | 120 | 70 | 110 | 80 | 200 | 80 |
| Depth of Pre-stressing [μm] | 15 | 20 | 15 | 20 | 30 | 20 | 40 |
| Profile Depth of Ion exchange [μm] | n/a | n/a | 30 | n/a | n/a | n/a | n/a |

In Table II n/a = not available.

The glasses are particularly very satisfactorily chemically pre-stressed, whereby their mechanical strength or load-bearing properties are improved. Of course the ability to pre-stress the glass-ceramic is reduced with increasing ceramic proportion, however the breakage toughness is increased with increasing ceramic proportion, so that the materials according to the invention have sufficient strength or it can be obtained by pre-stressing. Besides the other suitable properties this makes the material according to the invention an outstanding material for making sufficiently crack-resistant fixed disk substrates by sufficient crystallization or pre-stressing.

The material according to the invention has sufficient chemical stability, and its thermal expansion properties are sufficiently compatible with those of the clamping materials and the drive shaft. Also the surfaces of the glass and glass-ceramic bodies are easily worked. Thus they can be worked to a micro-roughness (smoothness) of ≦0.5 nm. They have outstanding surface properties.

Unless otherwise stated, all percentage compositions are percentages by weight.

The disclosure in German Patent Application 199 17 921.2-45 of Apr. 20, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in glasses and glass-ceramics with high specific E- modulus and their applications, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass or glass-ceramic having a high specific elasticity modulus with a composition (in % by weight based on oxide content) comprising:

| | |
|---|---|
| $SiO_2$ | 25 to 50 |
| $B_2O_3$ | >5 to 16 |
| $Al_2O_3$ | 10 to 17 |
| $P_2O_5$ | 0 to 8 |
| $Li_2O$ | 5 to 15 |
| $Na_2O$ | 0 to 10 |
| $K_2O$ | 0 to 10 |
| MgO | 10 to 30 |
| CaO | 0 to 10 |
| SrO | 0 to 8 |
| ZnO | 0 to 8 |
| $TiO_2$ | 0.1 to 10 |
| $ZrO_2$ | 0 to 8 | and at least one refining agent, as needed, in an amount suitable for refining;
wherein a sum total amount of divalent metal oxides (RO) present is less than or equal to 45% by weight based on said oxide content and a sum total amount of alkali metal oxides ($R_2O$) present is less than or equal to 30% by weight based on said oxide content.

2. A glass or glass-ceramic having a high specific elasticity modulus with a composition (in % by weight based on oxide content) comprising:

| | |
|---|---|
| $SiO_2$ | 30 to 45 |
| $B_2O_3$ | >5 to 14 |
| $Al_2O_3$ | 10 to 15 |
| $P_2O_5$ | 0 to 8 |
| $Li_2O$ | 5 to 12 |
| $Na_2O$ | 0 to 6 |
| $K_2O$ | 0 to 8 |
| MgO | 15 to 30 |
| CaO | 0 to 8 |
| SrO | 0 to 8 |
| ZnO | 0 to 8 |
| $TiO_2$ | 1 to 8 |
| $ZrO_2$ | 0 to 5 | and at least one refining agent, as needed, in an amount suitable for refining;
wherein a sum total amount of divalent metal oxides (RO) present is less than or equal to 40% by weight based on said oxide content, a sum total amount of alkali metal oxides ($R_2O$) present is less than or equal to 20% by weight based on said oxide content and a sum total amount of said $SiO_2$ and said $B_2O_3$ and said $Al_2O_3$ is greater than or equal to 50 based on said oxide content.

3. A glass having a high specific elasticity modulus with a composition (in % by weight based on oxide content) comprising:

| | |
|---|---|
| $SiO_2$ | 35 to 45 |
| $B_2O_3$ | 6 to 12 |
| $Al_2O_3$ | 10 to 14 |
| $P_2O_5$ | 0.1 to 5 |
| $Li_2O$ | 8 to 12 |
| $Na_2O$ | 0 to 4 |
| $K_2O$ | 0 to 4 |
| MgO | 15 to 25 |
| CaO | 0 to 5 |
| SrO | 0 to 5 |
| ZnO | 0 to 5 |
| $TiO_2$ | 3 to 8 |
| $ZrO_2$ | 0 to 5 | and at least one refining agent, as needed, in an amount suitable for refining;
wherein a sum total amount of divalent metal oxides (RO) present is less than 35% by weight based on said oxide content, a sum total amount of said $TiO_2$ and said $ZrO_2$ is less than or equal to 10% by weight based on said oxide content and a sum total amount of alkali metal oxides ($R_2O$) present is less than or equal to 15% by weight based on said oxide content.

4. A glass having a high specific elasticity modulus with a composition (in % by weight based on oxide content) comprising:

| | |
|---|---|
| $SiO_2$ | 40 to 45 |
| $B_2O_3$ | 6 to 10 |
| $Al_2O_3$ | 11 to 13 |
| $P_2O_5$ | 0.1 to 3 |
| $Li_2O$ | 9 to 11 |
| $Na_2O$ | 0 to 2 |
| $K_2O$ | 0 to 2 |
| MgO | 17 to 23 |
| CaO | 0 to 3 |
| SrO | 0 to 3 |
| ZnO | 0 to 2 |
| $TiO_2$ | 3 to 7 |
| $ZrO_2$ | 0 to 3 | and at least one refining agent, as needed, in an amount suitable for refining;
wherein a sum total amount of divalent metal oxides (RO) present is less than or equal to 30% by weight based on said oxide content and a sum total amount of alkali metal oxides ($R_2O$) present is less than or equal to 30% by weight based on said oxide content.

5. The glass of glass ceramic as defined in claim 1 or 2, further comprising at least 1% by weight of said $P_2O_5$ based on said oxide content.

6. The glass as defined in claim 3 or 4, further comprising at least 1% by weight of said $P_2O_5$ based on said oxide content.

7. The glass or glass ceramic as defined in claim 1 or 2, further comprising up to 10% by weight, based on said oxide content, of a total amount of at least one member selected from the group consisting of $Fe_2O_3$, NiO, $Cr_2O_3$, CoO, CuO and $V_2O_5$.

8. The glass or glass ceramic as defined in claim 1 or 2, further comprising up to 8% by weight, based on said oxide content, of a total amount of at least one oxide of at least one element, and wherein said at least one element is selected from the group consisting of Ga, Ge, Y, Nb, Mo, La, Ce, Pr, Nd, Gd, Tb, Dy, Ho, Er, Tm, Yb, Hf and Ta.

9. The glass as defined in claim 3 or 4, further comprising up to 10% by weight, based on said oxide content, of a total amount of at least one member selected from the group consisting of $Fe_2O_3$, NiO, $Cr_2O_3$, CoO, CuO and $V_2O_5$.

10. The glass as defined in claim 3 or 4, further comprising up to 8% by weight, based on said oxide content, of a total amount of at least one oxide of at least one element, and wherein said at least one element is selected from the group consisting of Ga, Ge, Y, Nb, Mo, La, Ce, Pr, Nd, Gd, Tb, Dy, Ho, Er, Tm, Yb, Hf and Ta.

11. The glass or glass-ceramic as defined in claim 1 or 2, free of all but trace impurity amounts of both $As_2O_3$ and PbO.

12. The glass as defined in claim 3 or 4, free of all but trace impurity amounts of both $As_2O_3$ and PbO.

13. The glass or glass-ceramic as defined in claim 1 or 2, having elasticity modulus values $(E) > 90 \times 10^3$ $N/mm^2$ and $< 125 \times 10^3$ $N/mm^2$, specific elasticity modulus values $(E/\rho) > 30 \times 10^5$ N cm/g and $< 45 \times 10^5$ N cm/g and thermal expansion coefficient values $(\alpha_{20/300}) > 7.0 \times 10^{-6}/K$ and $< 11.0 \times 10^{-6}/K$.

14. The glass as defined in claim 3 or 4, having elasticity modulus values $(E) > 90 \times 10^3$ $N/mm^2$ and $< 125 \times 10^3$ $N/mm^2$, specific elasticity modulus values $(E/\rho) > 30 \times 10^5$ N cm/g and $< 45 \times 10^5$ N cm/g and thermal expansion coefficient values $(\alpha_{20/300})) > 7.0 \times 10^{-6}/K$ and $< 11.0 \times 10^{-6}/K$.

* * * * *